United States Patent
Hatano

(10) Patent No.: US 10,926,639 B2
(45) Date of Patent: Feb. 23, 2021

(54) IMAGE PROCESSING DEVICE, IN-VEHICLE CAMERA SYSTEM AND IMAGE PROCESSING METHOD

(71) Applicant: PANASONIC INTELLECTUAL PROPERTY MANAGEMENT CO., LTD., Osaka (JP)

(72) Inventor: Toshinobu Hatano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/781,701

(22) Filed: Feb. 4, 2020

(65) Prior Publication Data
US 2020/0262296 A1    Aug. 20, 2020

(30) Foreign Application Priority Data
Feb. 15, 2019   (JP) .............................. JP2019-025645

(51) Int. Cl.
| | | |
|---|---|---|
| *H04N 7/18* | (2006.01) | |
| *B60K 35/00* | (2006.01) | |
| *G06T 15/20* | (2011.01) | |
| *B60R 1/00* | (2006.01) | |

(52) U.S. Cl.
CPC ............. *B60K 35/00* (2013.01); *B60R 1/00* (2013.01); *G06T 15/20* (2013.01); *B60K 2370/736* (2019.05); *B60R 2300/101* (2013.01); *B60R 2300/303* (2013.01); *B60R 2300/602* (2013.01)

(58) Field of Classification Search
CPC ........... G06T 15/20; G06T 19/00; B60R 1/00; B60R 2300/101; B60R 2300/303; B60R 2300/602; H04N 7/181; H04N 13/00; H04N 13/10; H04N 13/117; H04N 13/122

USPC ........................................................ 348/148
See application file for complete search history.

(56) References Cited

U.S. PATENT DOCUMENTS

| | | | | |
|---|---|---|---|---|
| 2008/0129756 A1* | 6/2008 | Iwano | ................... | G06T 3/0025 345/632 |
| 2008/0136912 A1* | 6/2008 | Iwano | ................... | G06T 1/0007 348/148 |
| 2012/0069187 A1* | 3/2012 | Ozaki | ...................... | G09G 5/14 348/148 |
| 2014/0152827 A1* | 6/2014 | Yamamoto | ............ | G06T 3/4038 348/148 |

(Continued)

FOREIGN PATENT DOCUMENTS

| | | |
|---|---|---|
| JP | 4537537 | 9/2010 |
| WO | 2010/007960 | 1/2010 |

*Primary Examiner* — Gims S Philippe
(74) *Attorney, Agent, or Firm* — Greenblum & Bernstein, P.L.C.

(57) ABSTRACT

An image processing device includes a viewpoint transformation and image generation unit that performs viewpoint transformation processing on an image. The viewpoint transformation and image generation unit is configured to: generate a first viewpoint image by the viewpoint transformation processing on an input image; generate, before generating a second viewpoint image in which a viewpoint and a visual line are different from those of the first viewpoint image, one or more intermediate viewpoint images in which a viewpoint and a visual line are intermediate between those of the first viewpoint image and those of the second viewpoint image; and generate the second viewpoint image.

9 Claims, 6 Drawing Sheets

(56) References Cited

U.S. PATENT DOCUMENTS

2014/0362078 A1\* 12/2014 Yamada ................. G06T 15/00
345/419

\* cited by examiner

IMAGE PROCESSING DEVICE, IN-VEHICLE CAMERA SYSTEM AND IMAGE PROCESSING METHOD

FIELD

The present disclosure relates to an image processing device capable of changing a visual line and a viewpoint of an image, an in-vehicle camera system and an image processing method.

BACKGROUND

In related art, a sensing technology has been developed to effectively assist driving of an automobile. A camera serving as a typical image information input device is miniaturized and can be attached in a free arrangement, and a driver can visually recognize a video not only behind a vehicle but also around the vehicle.

An image processing technology capable of processing high-definition pixel information with low power has been established, and a transmission method of signals from the camera is also shifting from an analog video signal output system in related art to a high-speed serial digital signal output method capable of stably transmitting the high-definition image information.

A device that combines images from a plurality of cameras and displays and guides a situation around the automobile including a blind spot of the driver has been put into practical use as a driving assistance device using the image from the camera. By performing viewpoint transformation and image synthesis on the image, the driver can be provided with an image in which a viewpoint and a visual line are different from those of the image.

JP-B-4537537 proposes to simplify an operation for changing a virtual viewpoint and a direction of a virtual visual line, and enlarging or reducing a screen. In this proposal, switching to a top view display, by a user operation such as a shift lever operation as a trigger, a side view display, a rear view display and the like is possible using an image from a camera.

SUMMARY

When a view display is switched in related art, an invalid black image is inserted and displayed between view displays, and the driver cannot obtain video information at a moment of the switching.

In addition, in JP-B-4537537, the view display is switched using the user operation as a trigger, and the view display is performed at a viewpoint corresponding to the user operation. However, when the driver switches to another view display having a different viewpoint while viewing the view display, the driver may lose a visual field sense. For example, if the viewpoint is suddenly switched while the vehicle is moved backward at the time of parking, the driver loses the visual field sense of a rear side, which may hinder smooth parking.

The present disclosure has been made in view of the above-described circumstances in related art, and an object thereof is to provide an image processing device, an in-vehicle camera system and an image processing method capable of implementing effective driving assistance by inserting one or more view displays between a first view display and a second view display to smoothly change a viewpoint and a visual line of these view displays.

The present disclosure provides an image processing device including: a viewpoint transformation and image generation unit that performs viewpoint transformation processing on an image. The viewpoint transformation and image generation unit is configured to: generate a first viewpoint image by the viewpoint transformation processing on an input image; generate, before generating a second viewpoint image in which a viewpoint and a visual line are different from those of the first viewpoint image, one or more intermediate viewpoint images in which a viewpoint and a visual line are intermediate between those of the first viewpoint image and those of the second viewpoint image; and generate the second viewpoint image.

The present disclosure also provides an in-vehicle camera system including: the image processing device; and a display processing unit that performs display control for continuously performing a first view display based on the first viewpoint image, one or more intermediate view displays based on one or more intermediate viewpoint images, and the second view display based on the second viewpoint image.

The present disclosure further provides an image processing method including: generating a first viewpoint image by viewpoint transformation processing on an input image; generating, before generating a second viewpoint image in which a viewpoint and a visual line are different from those of the first viewpoint image, one or more intermediate viewpoint images in which a viewpoint and a visual line are intermediate between those of the first viewpoint image and those of the second viewpoint image; and generating the second viewpoint image.

According to the present disclosure, one or more view images can be inserted between the first view display and the second view display to smoothly change the viewpoint and the visual line of these view displays, thereby implementing effective driving assistance.

DETAILED DESCRIPTION

Hereinafter, an embodiment of an image processing device, an in-vehicle camera system and an image processing method according to the present disclosure will be described in detail with reference to the drawings as appropriate. However, detailed descriptions more than necessary may be omitted. For example, a detailed description of a well-known matter or a repeated description of substantially the same configuration may be omitted. This means to avoid unnecessary redundancy in the following description and to facilitate understanding of those skilled in the art. It should be noted that the accompanying drawings and the following description are provided to enable those skilled in the art to fully understand the present disclosure, and are not intended to limit the claimed subject matter.

Embodiment

In the present embodiment, a configuration example applied to image processing on an image from a camera attached to a vehicle will be described as an example of the image processing device and the image processing method according to the present disclosure.

In the following description, an example applied to the image processing device incorporated in the in-vehicle camera system will be described. However, the present invention is not limited to this, and can be applied to a general-purpose image processing device that performs image processing on images from various cameras. Although the example of image processing on an image from one back camera attached to a vehicle will be described, the present invention can also be applied to image processing for viewpoint and visual line transformation using images from a plurality of cameras.

Figure 1:
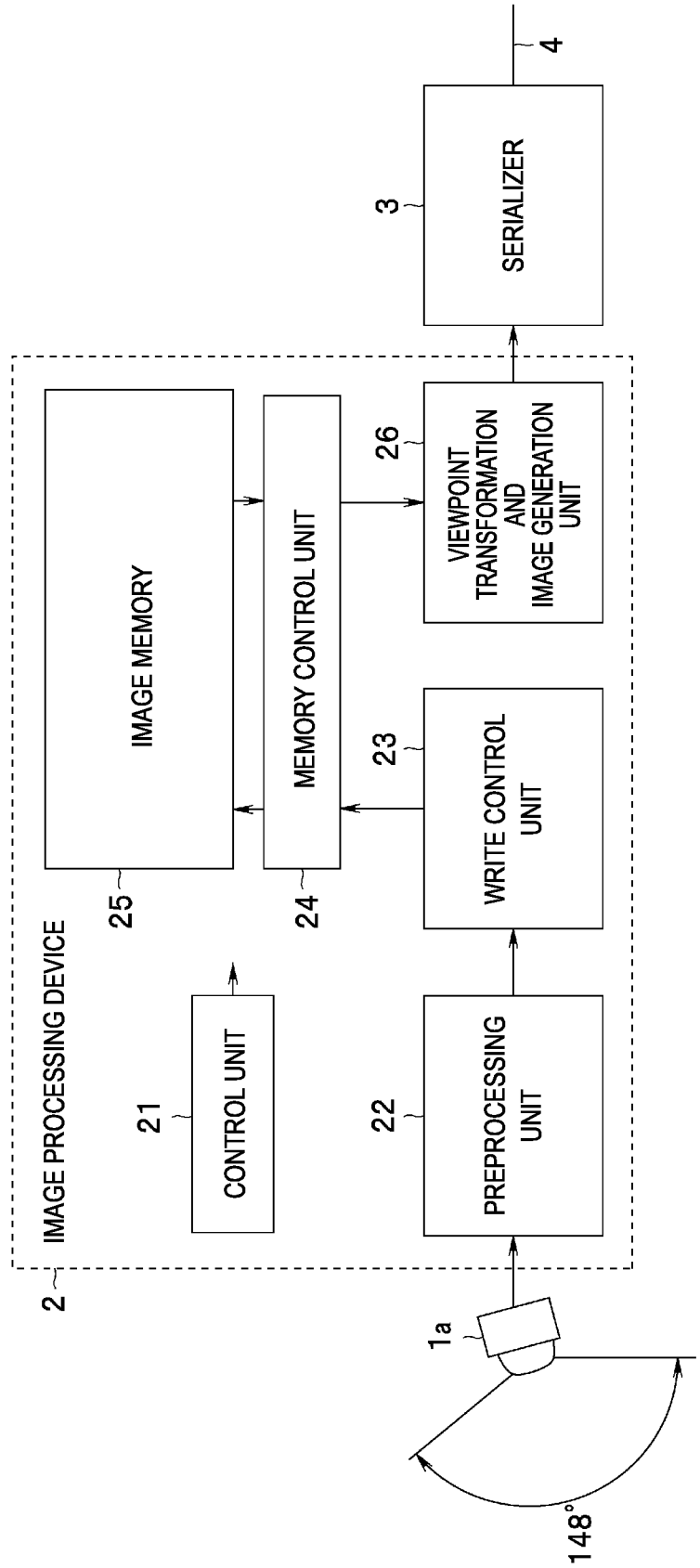
FIG. 1 is a block diagram showing a configuration example of an image processing device according to an embodiment.
Figure 2:
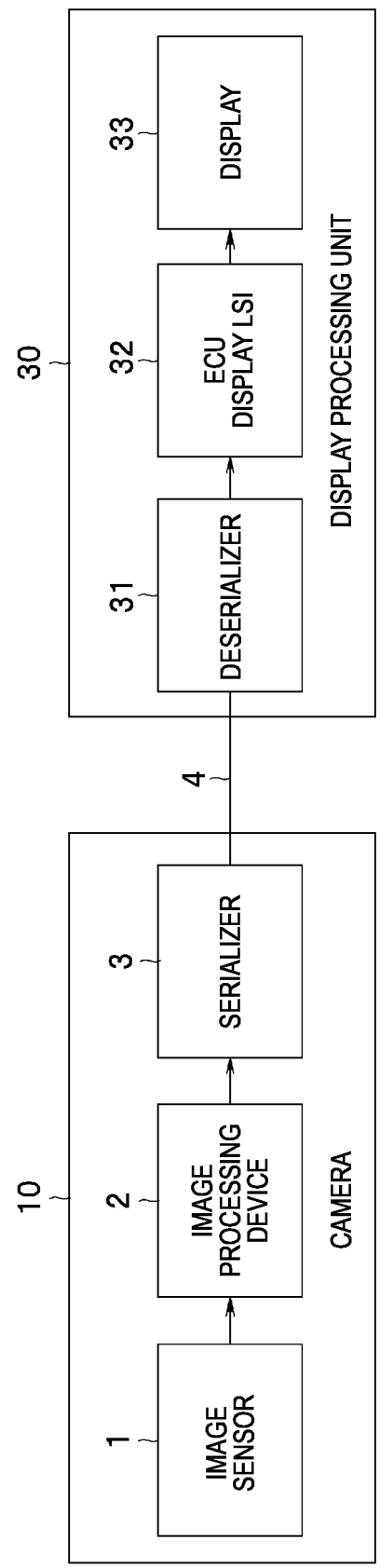
FIG. 2 is a block diagram showing an in-vehicle camera system including a camera formed by incorporating the image processing device in FIG. 1.

FIG. 1 is a block diagram showing a configuration example of an image processing device according to the embodiment. FIG. 2 is a block diagram showing the in-vehicle camera system including the camera formed by incorporating the image processing device in FIG. 1.

As shown in FIG. 2, the in-vehicle camera system mainly includes a camera 10 and a display processing unit 30. The camera 10 is provided in each parts of an automobile (not shown), outputs an image obtained by imaging surroundings of an own vehicle, and transmits the image to the display processing unit 30 provided in the vehicle via a cable 4.

The camera 10 includes an image sensor 1, an image processing device 2 and a serializer 3. The image sensor 1 includes an imaging element such as a CMOS sensor, and images a subject and outputs an imaging signal to the image processing device 2.

The image processing device 2 may include, for example, an image signal processor (ISP). The image processing device 2 may include a microprocessor unit (MPU), a central processing unit (CPU), a digital signal processor (DSP), a graphical processing unit (GPU) and the like. The image processing device 2 generates an image (a moving image) by predetermined image signal processing on the imaging signal from the image sensor 1. As will be described below, the image processing device 2 performs processing such as distortion correction, viewpoint and visual line change, size change and the like (hereinafter referred to as viewpoint transformation processing) on the image. The image processing device 2 outputs the processed image to the serializer 3 according to a predetermined transmission standard. For example, the image processing device 2 can perform digital video port (DVP) parallel output and MIPI (mobile industry processor interface) serial output. The serializer 3 converts the image from the image processing device 2 into high-speed serial data and transmits the high-speed serial data via the cable 4.

The display processing unit 30 mainly includes a deserializer 31, an ECU display LSI 32 and a display 33.

The deserializer 31 receives the image transmitted via the cable 4, converts the image into parallel data, and outputs the parallel data to the ECU display LSI 32. For example, the deserializer 31 converts the received image into a DVP parallel output.

The ECU display LSI 32 is a display large scale integration (LSI) configured in an electronic control unit (ECU), converts the input image into display data corresponding to the display 33, and outputs the display data to the display 33.

As the display 33, for example, a display using a liquid crystal display device (LCD) or the like of a navigation device disposed in a dashboard or the like of a vehicle can be used. In addition, in recent years, a display device such as an LCD may be adopted for a rearview mirror or a side mirror of an automobile, and these side mirror display devices or rearview mirror display devices may be adopted as the display 33. The display 33 is configured in a position and a size that can be seen by a driver during driving.

The display 33 displays the image on a display screen by using the display data from the ECU display LSI 32.

As shown in FIG. 1, the image processing device 2 mainly includes a control unit 21, a preprocessing unit 22, a write control unit 23, a memory control circuit 24, an image memory 25 and a viewpoint transformation and image generation unit 26. The memory control circuit 24 and the image memory 25 may be configured outside the image processing device 2.

The control unit 21 may include a processor using a central processing unit (CPU) or the like, or may operate according to a program stored in a memory (not shown) to control each unit, or may implement some or all functions with an electronic circuit of hardware. The control unit 21 controls each unit in the image processing device 2.

An imaging unit 1a constitutes the image sensor 1 in FIG. 1, and is attached to each part of the automobile (not shown), for example, front, rear, left and right end portions, and the like. The imaging unit 1a includes an imaging element (not shown) such as an optical lens and a CMOS sensor, and as shown in FIG. 1, for example, a moving image in a predetermined visual field range such as a front side, a lateral side and a rear side of the own vehicle is imaged. The imaging unit 1a images an optical image of the subject around the vehicle via the optical lens by the imaging element, and obtains an imaging signal by photoelectric conversion. The imaging unit 1a adopts, for example, a wide-angle lens (not shown) as the optical lens, and can perform imaging at a relatively wide angle. In the example in FIG. 1, a viewing angle of the imaging unit 1a is 148 degrees.

The imaging signal from the imaging unit 1a is supplied to the image processing device 2. The preprocessing unit 22 of the image processing device 2 controls imaging of the imaging unit 1a and capture the imaging signal from the imaging unit 1a under control of the control unit 21. The preprocessing unit 22 performs predetermined color image processing on the imaging signal, and then outputs each pixel data based on the imaging signal to the write control unit 23 in a raster scan order.

The write control unit 23 controls writing of the input pixel data into the image memory 25 under the control of the control unit 21. The write control unit 23 supplies the input pixel data to the memory control circuit 24 in the raster scan order.

The memory control circuit 24 controls writing and reading of the image memory 25. The memory control circuit 24 writes the input pixel data in the raster scan order into a predetermined address of the image memory 25. The memory control circuit 24 reads out the pixel data stored in the image memory 25 and supplies the read pixel data to the viewpoint transformation and image generation unit 26 under control of the viewpoint transformation and image generation unit 26.

The image memory 25 includes, for example, a dynamic random access memory (DRAM), and can store the pixel data of a predetermined number of frames. The image memory 25 stores the pixel data based on the imaging signal under control of the memory control circuit 24. In the image memory 25, the pixel data constituting the image of each frame is sequentially stored based on the imaging signal from the imaging unit 1*a*. Hereinafter, an image of one frame constituted by the pixel data stored in the image memory 25 is referred to as a frame current image (an original image).

Figure 3:
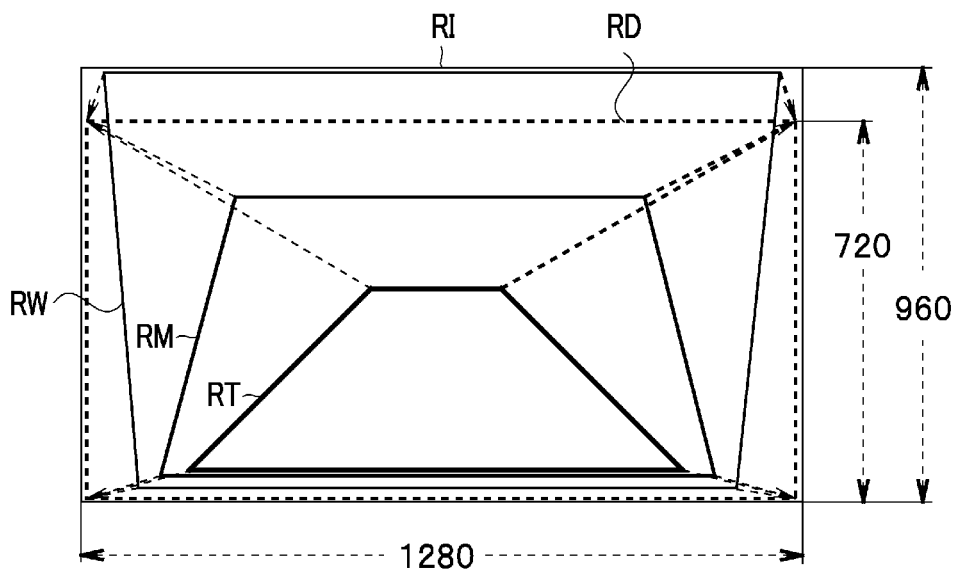
FIG. 3 is an explanatory view showing writing and reading of an image memory.

FIG. 3 is an explanatory view showing writing and reading of the image memory 25.

A region RI in FIG. 3 indicates a range of images (frame original images) based on the imaging signal from the imaging unit 1*a*. In the example in FIG. 3, the frame original image is formed of the pixel data of horizontal 1280 pixels× vertical 960 pixels. The image memory 25 stores each pixel data constituting the frame original image at an address corresponding to a pixel position. The image memory 25 can store the images for the predetermined number of frames.

In the present embodiment, the viewpoint transformation and image generation unit 26 as an example of first and second viewpoint transformation and image generation units can generate an image in which a viewpoint and a visual line are changed with respect to the image (the frame original image) imaged by the imaging unit 1*a* by controlling reading (cutout) of the pixel data stored in the image memory 25.

The image imaged by the imaging unit 1*a* has distortion. In particular, the imaging unit 1*a* adopts the wide-angle lens as described above, and has a relatively large distortion. In such distortion correction (DC) processing, the pixel position may be transformed in accordance with the distortion for each pixel data of the frame original image based on distortion information. That is, the DC processing can be performed by reading out the pixel data stored in the image memory 25 in an order corresponding to the pixel position to be corrected.

In addition, the viewpoint transformation and image generation unit 26 performs perspective correction (PC) processing in order to transform the viewpoint and the visual line. Also for the PC processing, the pixel data stored in the image memory 25 may be read out in the order corresponding to the pixel position to be transformed. The PC processing includes resizing processing for changing a size of the frame original image.

The viewpoint transformation and image generation unit 26 executes the DC processing and the PC processing (hereinafter referred to as DCPC processing) as the viewpoint transformation processing. The DCPC processing can be obtained from a correspondence between the pixel position of the frame current image stored in the image memory 25 and the pixel position of the image to be output based on the size of the frame original image, a size of an effective display region of the display 33, information on the wide-angle lens of the imaging unit 1*a*, information on the viewpoint and visual line and the like.

The viewpoint transformation and image generation unit 26 includes a memory (not shown) that holds the correspondence as a lookup table. The lookup table is a table indicating the correspondence between pixel position coordinates of the frame current image stored in the image memory 25 and pixel position coordinates of the image to be output.

The viewpoint transformation and image generation unit 26 has a plurality of lookup tables (not shown) for the DCPC processing corresponding to a type of the viewpoint transformation processing, that is, the viewpoint and the visual line to be transformed.

As the viewpoint and the visual line are designated by the control unit 21, the viewpoint transformation and image generation unit 26 refers to a corresponding lookup table and outputs the image subjected to the viewpoint and visual line transformation.

The viewpoint transformation and image generation unit 26 may output the image subjected to the viewpoint transformation processing by calculation without adopting the lookup table. The viewpoint transformation and image generation unit 26 outputs the generated image to the serializer 3 according to the predetermined transmission standard.

FIG. 1 has described the example in which only the image from one imaging unit 1*a* is stored in the image memory 25 and the viewpoint transformation and image generation unit 26 performs the viewpoint transformation processing. However, images from a plurality of imaging units can be stored in the image memory 25, and the viewpoint transformation and image generation unit 26 can perform the viewpoint transformation processing using the plurality of images.

A broken line frame in FIG. 3 indicates a range of an effective display region RD of the display 33, and a size thereof is horizontal 1280 pixels×vertical 720 pixels in the example in FIG. 3. For example, the viewpoint transformation and image generation unit 26 reads out the pixel data so as to display, in the effective display region RD of the display 33, an image portion of a relatively wide region RW having a trapezoidal shape in which a screen upper end is wide and a screen lower end is narrow in the region RI of the image in FIG. 3. The viewpoint transformation and image generation unit 26 generates data of the pixel position not included in the frame original image by filter interpolation processing.

For example, the viewpoint transformation and image generation unit 26 reads out the pixel data so as to display, in the effective display region RD of the display 33, an image portion of a relatively wide region RM having a trapezoidal shape in which a screen upper end side is narrow and a screen lower end side is wide in the region RI of the image in FIG. 3.

For example, the viewpoint transformation and image generation unit 26 reads out the pixel data so as to display, in the effective display region RD of the display 33, an image portion of a relatively narrow area RT having a trapezoidal shape in which a screen upper end side is extremely narrow and a screen lower end side is wide in the region RI of the image in FIG. 3.

The regions RW, RM, RT in FIG. 3 show the range of the images to be read out for viewpoint and visual line transformation processing and the resizing processing on the frame original image. In the DCPC processing, the pixel data is read out in consideration of the distortion.

The control unit 21 is configured to receive an input of a change instruction signal for changing the viewpoint and the visual line of the image of the imaging unit 1*a* from the ECU or the like. For example, the change instruction signal is input to the control unit 21 based on a shift lever operation, a touch panel operation (not shown) provided on the display 33 or the like. When the change instruction signal is input, the control unit 21 controls the viewpoint transformation and image generation unit 26 such that the viewpoint transformation processing is performed corresponding to the change instruction signal. Thereby, the viewpoint transformation and image generation unit 26 performs a preset viewpoint transformation processing in accordance with, for example, the shift lever operation, and generates a moving image in which the viewpoint and the visual line are changed.

Figure 4:
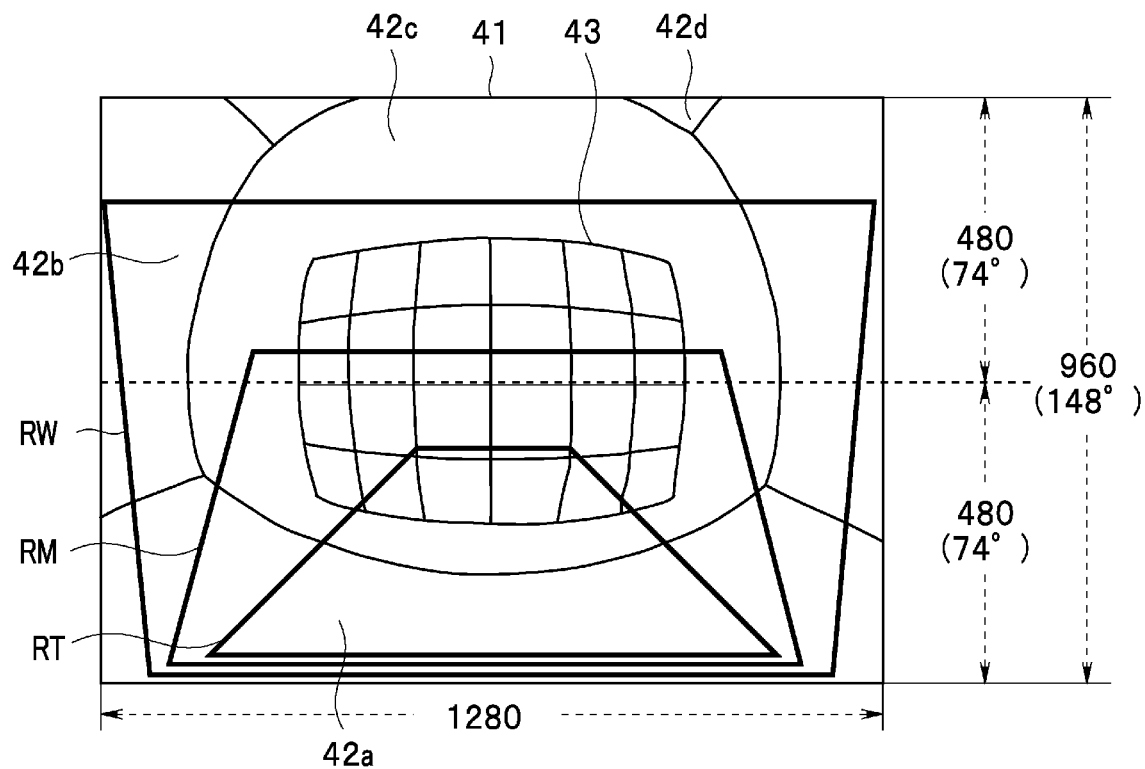
FIG. 4 is an explanatory view showing a relationship of regions RW, RM, RT of an image and a display mode of each view display.

FIG. 4 is an explanatory view showing a relationship of the regions RW, RM, RT of the image and a display mode of each view display. FIG. 4 shows an example of the image imaged by the imaging unit 1a.

An image size of an image 41 is horizontal 1280 pixels× vertical 960 pixels, and the number of pixels in a vertical direction corresponds to the viewing angle 148 degrees of the imaging unit 1a. The image 41 is obtained by imaging a rectangular panel arranged on a front wall of a room, and the panel has 24 squares horizontally and vertically divided into 6×4 in straight lines.

The room has walls, a floor and a ceiling built horizontally and vertically. In the example in FIG. 4, an image 42a of the floor, an image 42b, 42c of the walls, and an image 42d of the ceiling are curved at boundaries thereof. This is due to the distortion of the wide-angle lens adopted in the imaging unit 1a. Similarly, also for an image 43 of the rectangular panel, an outer periphery of the panel and the squares are curved.

The viewpoint transformation and image generation unit 26 can obtain an image without any viewpoint and visual line distortion by performing the DCPC processing for the distortion correction, the viewpoint and visual line change, and the resizing processing.

For example, the viewpoint transformation and image generation unit 26 sets a region where the relatively wide region RW in an imaging range of the image 41 is cut out, and outputs an image corresponding to the region RW as an image to be displayed in the effective display region of the display 33. A display mode of the display 33 for displaying the image is a display mode in a case where the region RW is a range including the entire panel, the floor in front of the panel, the front wall and the side wall, and the visual line is substantially parallel and a wide range from a near view to a far view is seen.

For example, the viewpoint transformation and image generation unit 26 sets a region where the relatively narrow region RT in the imaging range of the image 41 is cut out, and outputs an image corresponding to the region RT as an image to be displayed in the effective display region of the display 33. A display mode of the display 33 for displaying the image is a display mode in a case where the region RT is a range mainly including a part of a lower end of the panel and the floor in front of the panel, and the visual line is relatively downward and the near view is viewed as looking down.

For example, the viewpoint transformation and image generation unit 26 sets a region where the region RM in the imaging range of the image 41 is cut out, and outputs an image corresponding to the region RM as an image to be displayed in the effective display region of the display 33. A display mode of the display 33 for displaying the image is a display mode in which the region RM mainly includes a lower half of the panel, the floor in front of the panel and a part of the front wall, and the viewpoint and the visual line are between displays corresponding to the regions RW, RT.

In the present embodiment, when the change instruction signal is input, the control unit 21 performs a display (hereinafter referred to as an intermediate view display) of a moving image (hereinafter referred to as an intermediate viewpoint image) in which the viewpoint and the visual line are gradually changed for each frame in order to prevent a sudden change from a display (hereinafter referred to as a first view display) of a moving image (hereinafter referred to as a first viewpoint image) of the current viewpoint and visual line to a display (hereinafter referred to as a second view display) of a moving image (hereinafter referred to as a second viewpoint image) of a viewpoint and a visual line corresponding to the viewpoint change instruction signal, and the control unit 21 controls the viewpoint transformation and image generation unit 26 so as to reach the second view display serving as a target after a predetermined frame. That is, the viewpoint transformation and image generation unit 26 performs different DCPC processing for each predetermined frame (for example, each frame) so as to perform one or more intermediate view displays based on the intermediate viewpoint images in which the viewpoint and the visual line are gradually changed between the first view display and the second view display.

For example, the image generated by the viewpoint transformation and image generation unit 26 is set as the first viewpoint image based on the region RW in FIG. 4, and the image generated by the viewpoint transformation and image generation unit 26 is set as the second viewpoint image based on the region RT in FIG. 4. In this case, the image generated by the viewpoint transformation and image generation unit 26 based on the region RT is used as the intermediate viewpoint image, for example.

Figure 5:
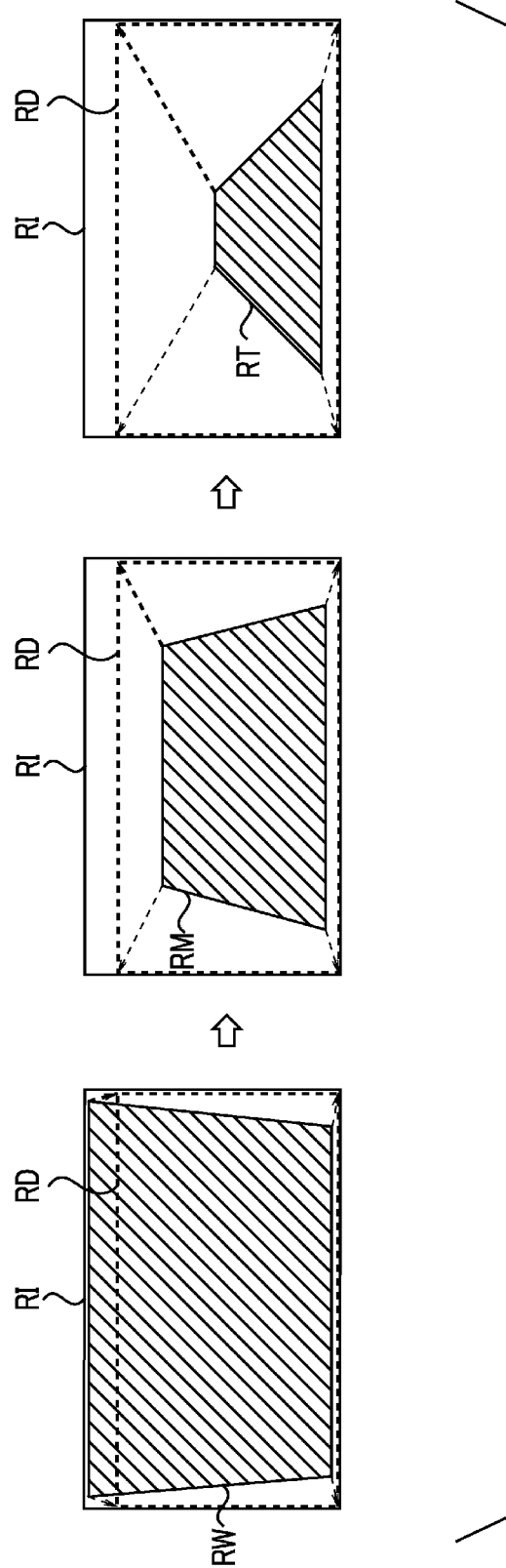
FIG. 5 is an explanatory view showing changes in the image obtained as a result of viewpoint transformation processing.

FIG. 5 is an explanatory view showing changes in the image obtained as a result of such viewpoint transformation processing. A left side of FIG. 5 shows the first view display in which the first viewpoint image based on the region RW is displayed in the effective display region RD. A right side of FIG. 5 shows the second view display in which the second viewpoint image based on the region RT is displayed in the effective display region RD. Then, during the switching from the first view display to the second view display, the intermediate view display in which the intermediate viewpoint image based on the region RM is displayed in the effective display region RD is performed.

As shown in FIG. 5, the intermediate view display is for smoothing the viewpoint and the visual line from the first view display to the second view display, and by performing the intermediate view display, the driver can feel the viewpoint and visual line change smoothly, and the driver can be prevented from losing a visual field sense since a visual field range is switched smoothly.

Figure 6:
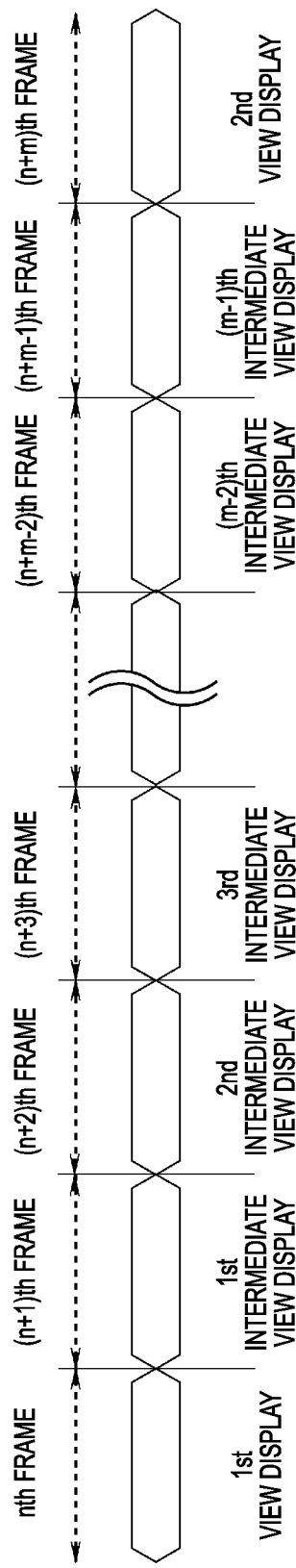
FIG. 6 is a timing chart showing viewpoint transformation processing in the present embodiment.
Figure 7:
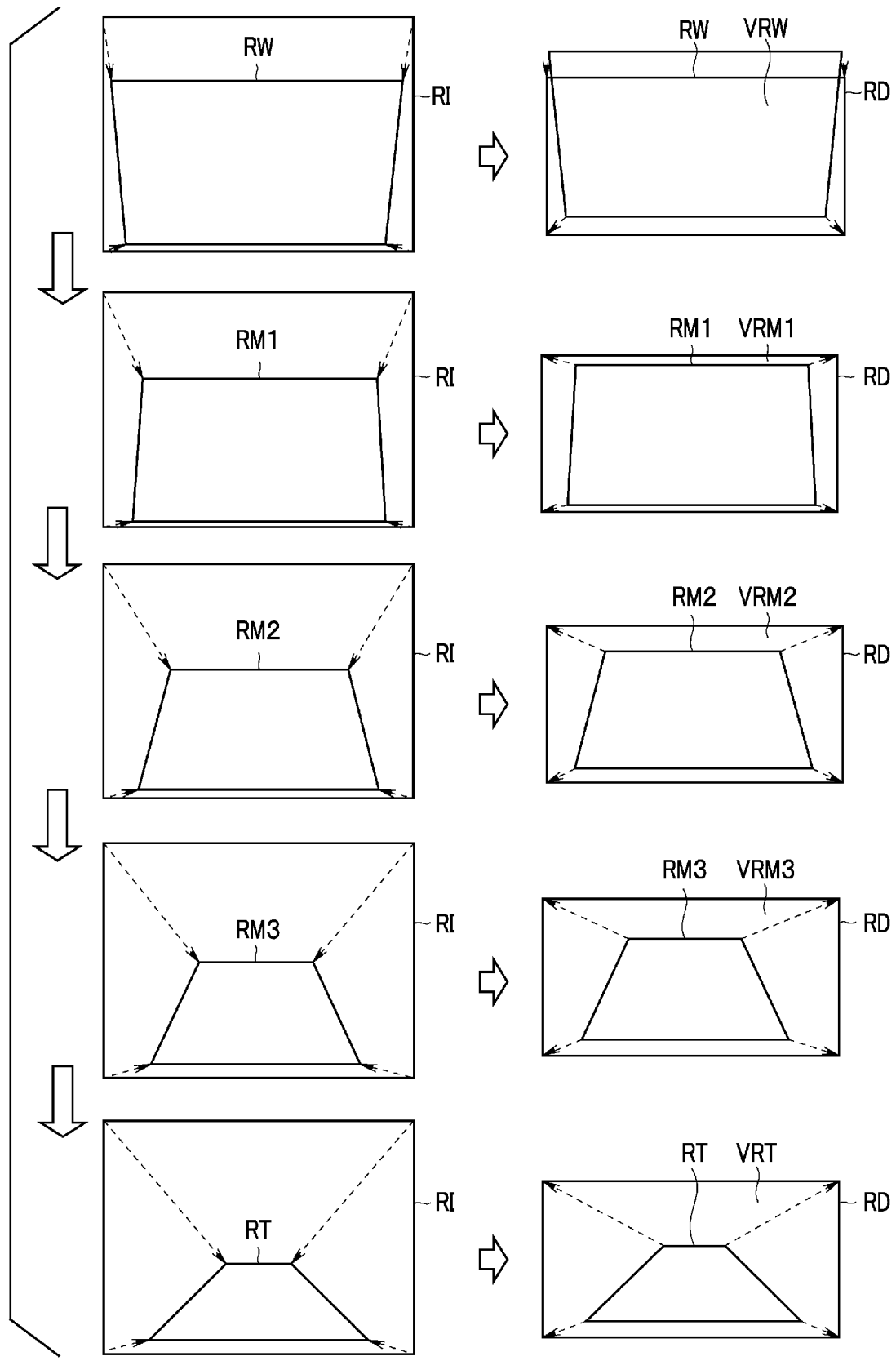
FIG. 7 is an explanatory view showing changes in a first view display, an intermediate view display and a second view display.

Next, an operation according to the embodiment configured in this manner will be described with reference to FIGS. 6 and 7. FIG. 6 is a timing chart showing the viewpoint transformation processing according to the present embodiment. FIG. 7 is an explanatory view showing changes in the first view display, the intermediate view display and the second view display.

The imaging signal obtained by imaging by the imaging unit 1a is supplied to the preprocessing unit 22. The preprocessing unit 22 performs predetermined color signal processing on the imaging signal. The write control unit 23 writes the pixel data based on the imaging signal from the preprocessing unit 22 into the image memory 25 via the memory control circuit 24 in the raster scan order. In this manner, the frame original image of the predetermined frame is stored in the image memory 25. The frame original image is sequentially written into the image memory 25 in a frame period.

The control unit 21 causes the viewpoint transformation and image generation unit 26 to perform the DCPC processing for each predetermined frame (for example, each frame) while switching the lookup table. The image generated by the viewpoint transformation and image generation unit 26 is supplied to the ECU display LSI 32 via the serializer 3, the cable 4 and the deserializer 31, and is displayed on a display screen of the display 33. In this manner, the moving image is displayed on the display 33 based on the imaging signal input from the imaging unit 1a for each frame.

In the present embodiment, the control unit 21 performs the viewpoint transformation processing such that the viewpoint and the visual line are changed smoothly.

FIG. 6 shows this control, and the control unit 21 generates and displays the first viewpoint image for the first view display up to the nth frame in response to some operation of the driver. In addition, the control unit 21 generates and displays the second viewpoint image for the second view display in the (n+m)th frame. Then, during the (n+1)th to (n+m−1)th frames, the control unit 21 generates and displays a plurality of intermediate viewpoint images for the first to the (m−1)th intermediate view displays for smoothing the viewpoint and visual line change between the first view display and the second view display.

The control unit 21 may perform the intermediate view displays in which the viewpoint and the visual line are different for each frame, or may switch the viewpoint and the visual line of the intermediate view displays for every several frames.

FIG. 7 shows an example in which three intermediate view displays are performed between the first view display and the second view display. FIG. 7 shows regions cut out from the image memory 25 on the left side and displays on the effective display region RD of the display 33 on the right side, and shows a state in accordance with the changes in time from top to bottom. The region RI in FIG. 7 indicates the range of the frame original image.

For example, an operation will be described as an example in a case where the vehicle is moved backward and stopped in a parking lot. In order to simplify the description, the imaging unit 1a is attached to a rear end of the automobile, and only the imaging signal from the imaging unit 1a is input to the image processing device 2.

Here, the driver stops the automobile while moving the automobile backward. When a back gear is engaged by the shift lever operation of the driver, the control unit 21 controls each unit so as to set an image to be displayed on the display 33 as the first viewpoint image. In this case, the region RW in FIG. 7 indicates the range of the image used to generate the first viewpoint image. The viewpoint transformation and image generation unit 26 cuts out the pixel data of the region RW by the DCPC processing using, for example, the lookup table, and transforms the pixel data into a size corresponding to the effective display region RD of the display 33.

Thereby, a first view display VRW based on the first viewpoint image is performed on the display screen of the display 33 (see FIG. 7). The driver can confirm a wide range behind the automobile by looking at the first view display VRW.

In general, in back parking, a steering wheel operation is often performed such that the vehicle is moved backward while being rotated and is moved substantially straight backward at a predetermined timing. Therefore, the control unit 21 starts the switching from the first view display to the intermediate view display, that is, switching of the lookup table used for the DCPC processing, from a time when the steering wheel operation is performed so as to move the vehicle substantially straight backward. Finally, the control unit 21 can perform the second view display.

FIG. 7 shows the example in which three intermediate view displays VRM1, VRM2, VRM3 are adopted in order to smoothly switch the viewpoint and the visual line. When the steering wheel operation is performed so as to move the vehicle substantially straight backward, the viewpoint transformation and image generation unit 26 generates a first intermediate viewpoint image corresponding to the pixel data of the region RM1 in FIG. 7 by switching the lookup table used for the DCPC processing in the next frame. The first intermediate viewpoint image is supplied to the display 33 to perform the first intermediate view display VRM1.

The viewpoint transformation and image generation unit 26 switches the lookup table used for the DCPC processing after a predetermined time from the switching to the first intermediate view display VRM1, and generates a second intermediate viewpoint image corresponding to the pixel data in the region RM2 in FIG. 7. The second intermediate viewpoint image is supplied to the display 33 to perform the second intermediate view display VRM2.

The viewpoint transformation and image generation unit 26 switches the lookup table used for the DCPC processing after a predetermined time from the switching to the second intermediate view display VRM2, and generates a third intermediate viewpoint image corresponding to the pixel data in the region RM3 in FIG. 7. The third intermediate viewpoint image is supplied to the display 33 to perform the third intermediate view display VRM3.

The viewpoint transformation and image generation unit 26 switches the lookup table used for the DCPC processing after a predetermined time from the switching to the third intermediate view display VRM3, and generates the second viewpoint image corresponding to the pixel data of the region RT in FIG. 7. The second viewpoint image is supplied to the display 33 to perform a second view display VRT.

In this manner, a wide visual field of the rear side can be ensured by the first view display VRW at a start of the back parking, and a close distance between a bumper (not shown) at a rear end of the vehicle and ground can be enlarged and displayed by the second view display VRT immediately before completion of the back parking. By the second view display VRT, a rear end of a parking range is easily checked, driving assistance for reliably stopping the vehicle within the parking range is effectively performed, and derailment, climbing on a sidewalk, contact with a wall surface, bumper crash to an installation pole and the like can be prevented.

As is clear from a comparison of regions RW, RM1, RM2, RM3, RT in FIG. 7 used for the DCPC processing, first to third intermediate view displays VRM1 to VRM3 for smoothly changing the viewpoint and the visual line are performed during the switching from the first view display VRW to the second view display VRT. Thereby, the driver can reliably confirm the rear side from the display on the display 33 without losing the visual field sense of the rear side.

In the present embodiment as described above, when the view display is switched, a black image is not displayed, and the view display is continuously performed even during the switching. In addition, between the first view display and the second view display, one or more intermediate view displays for smoothing the viewpoint and visual line change are performed, so that the visual field of the driver can be easily checked.

Even in actual vision, the visual field is constant and visual information is confirmed in detail by zooming in a brain a subject to be watched. In order to synchronize a timing with human brain visual activity in this manner, by generating and continuously performing the intermediate view displays by frame by frame control, the viewpoint and the visual line can be changed without causing a sense of discomfort to the driver.

Such switching of view display is implemented by the image processing device built in the camera, and a processing load for switching the view display can be prevented from increasing in the ECU in the in-vehicle camera system.

In the image processing device according to the embodiment as described above, the viewpoint transformation and image generation unit 26 generates the first viewpoint image by the viewpoint transformation processing on the input image. The viewpoint transformation and image generation unit 26 generates the second viewpoint image in which the viewpoint and the visual line are different from those of the first viewpoint image. The viewpoint transformation and image generation unit 26 generates one or more intermediate viewpoint images in which the viewpoint and the visual line are intermediate between those of the first viewpoint image and those of the second viewpoint image, between generation of the first viewpoint image and generation of the second viewpoint image.

Thereby, the viewpoint and the visual line can be smoothly changed from the first viewpoint image to the second viewpoint image, and the moving image can be easily confirmed.

In the image processing device according to the embodiment, the viewpoint transformation and image generation unit 26 performs the viewpoint transformation processing for each frame. Thereby, the viewpoint and the visual line can be changed for each frame, and an extremely smooth and easy-to-view moving image can be displayed.

In the image processing device according to the embodiment, the viewpoint transformation and image generation unit 26 generates the plurality of intermediate viewpoint images in which the viewpoint and the visual line have the same direction of change thereof from the first viewpoint image toward the second viewpoint image. Thereby, the viewpoint and visual line change can be smoothed, and the visual field sense can be prevented from being lost.

In the image processing device according to the embodiment, the viewpoint transformation and image generation unit 26 implements the viewpoint transformation processing by distortion correction processing and perspective image processing. Thereby, the distortion of the input image is corrected, and an image of a desired viewpoint and visual line having a desired size without distortion can be obtained.

In the image processing device according to the embodiment, the viewpoint transformation and image generation unit 26 performs the viewpoint transformation processing based on a user operation. Thereby, the viewpoint transformation processing is performed by some user operation such as the shift lever operation or the steering wheel operation, and images of different viewpoints and visual lines are obtained.

In the image processing device according to the embodiment, the viewpoint transformation and image generation unit 26 generates the plurality of intermediate viewpoint images corresponding to the human brain visual activity. Thereby, the moving image can be displayed with the viewpoint and visual line change in accordance with the human brain visual activity.

The in-vehicle camera system according to the present embodiment includes the image processing device 2 and the display processing unit 30 that performs display control on the image. The display processing unit 30 continuously performs the first view display based on the first viewpoint image, one or more intermediate view displays based on one or more intermediate viewpoint images, and the second view display based on the second viewpoint image. Thereby, the view displays can be continuously performed without displaying a black image during the switching of the view displays. Since one or more intermediate view displays that smooth the viewpoint and visual line change are performed between the first view display and the second view display, smooth display is possible and the visual field sense can be prevented being lost even when the display is changed from the first view display to the second view display.

In the in-vehicle camera system according to the embodiment, the display processing unit 30 performs the first view display, one or more intermediate view displays, and the second view display on a side mirror display device or a rearview mirror display device of the automobile. Thereby, in the side mirror display device or the rearview mirror display device, the viewpoint and the visual line can be changed smoothly when the vehicle is moved backward.

In the image processing method according to the embodiment, the viewpoint transformation and image generation unit 26 generates the first viewpoint image by the viewpoint transformation processing on the input image. The viewpoint transformation and image generation unit 26 generates one or more intermediate viewpoint images in which the viewpoint and the visual line are intermediate between those of the first viewpoint image and those of the second viewpoint image, before generation of the second viewpoint image in which the viewpoint and the visual line are different from those of the first viewpoint image. Thereby, the first viewpoint image, one or more intermediate viewpoint images, and the second viewpoint image are sequentially generated, and the moving image in which the viewpoint and the visual line are smoothly changed is obtained.

Although the embodiment is described above with reference to the drawings, it is needless to say that the present invention is not limited to such examples. It will be apparent to those skilled in the art that various alterations, modifications, substitutions, additions, deletions and equivalents can be conceived within the scope of the claims, and it should be understood that they also belong to the technical scope of the present invention. Each component in the embodiment described above may be combined freely in the range without deviating from the spirit of the invention.

The present disclosure is useful as an image processing device, an in-vehicle camera system and an image processing method capable of implementing effective driving assistance.

This application is based on and claims priority from Japanese Patent Application No. 2019-025645 filed on Feb. 15, 2019, the entire contents of which are incorporated herein by reference.

The invention claimed is:

1. An in-vehicle camera system comprising:
   an image processing device comprising:
   a processor that performs viewpoint transformation processing on an image,
   wherein the processor is configured to:
   generate a first viewpoint image by the viewpoint transformation processing on an input image;
   generate, before generating a second viewpoint image in which a viewpoint and a visual line are different from those of the first viewpoint image, one or more intermediate viewpoint images in which a viewpoint and a visual line are intermediate between those of the first viewpoint image and those of the second viewpoint image; and
   generate the second viewpoint image; and
   a display processing unit that performs display control for continuously performing a first view display based on the first viewpoint image, one or more intermediate view displays based on one or more intermediate viewpoint images, and the second view display based on the second viewpoint image.

2. The in-vehicle camera system according to claim 1, wherein the processor performs the viewpoint transformation processing for each frame.

3. The in-vehicle camera system according to claim 1, wherein the processor generates a plurality of intermediate viewpoint images in which the viewpoint and the visual line have a same direction of change thereof from the first viewpoint image toward the second viewpoint image.

4. The in-vehicle camera system according to claim 1, wherein the processor implements the viewpoint transformation processing by distortion correction processing and perspective image processing.

5. The in-vehicle camera system according to claim 1, wherein the processor performs the viewpoint transformation processing based on a user operation.

6. The in-vehicle camera system according to claim 5, wherein the processor generates a plurality of intermediate viewpoint images corresponding to human brain visual activity.

7. The in-vehicle camera system according to claim 1, wherein the processor comprises:
   a first processor that generates the first viewpoint image by the viewpoint transformation processing on the input image and generates the second viewpoint image in which the viewpoint and the visual line are different from those of the first viewpoint image; and
   a second processor that generates the one or more intermediate viewpoint images in which the viewpoint and the visual line are intermediate between those of the first viewpoint image and those of the second viewpoint image between generation of the first viewpoint image and generation of the second viewpoint image.

8. The in-vehicle camera system according to claim 1, wherein the display processing unit performs the first view display, one or more intermediate view displays, and the second view display on a side mirror display device or a rearview mirror display device of an automobile.

9. An image processing method comprising:
generating, by a processor, a first viewpoint image by viewpoint transformation processing on an input image;
generating, by the processor and before generating a second viewpoint image in which a viewpoint and a visual line are different from those of the first viewpoint image, one or more intermediate viewpoint images in which a viewpoint and a visual line are intermediate between those of the first viewpoint image and those of the second viewpoint image;
generating, by the processor, the second viewpoint image; and
performing, by a display processing unit and continuously, a first view display based on the first viewpoint image, one or more intermediate view displays based on one or more intermediate viewpoint images, and the second view display based on the second viewpoint image.

\* \* \* \* \*